United States Patent [19]

Miwa et al.

[11] Patent Number: 5,420,664
[45] Date of Patent: May 30, 1995

[54] DRIVING APPARATUS FOR A ROTARY BODY IN USE WITH AN IMAGE FORMING APPARATUS

[75] Inventors: Tadashi Miwa; Toru Makino, both of Hachioji, Japan

[73] Assignee: Konica Corporation, Japan

[21] Appl. No.: 114,389

[22] Filed: Aug. 30, 1993

[30] Foreign Application Priority Data

| Sep. 2, 1992 [JP] | Japan | 4-258929 |
| Sep. 2, 1992 [JP] | Japan | 4-258933 |
| Sep. 4, 1992 [JP] | Japan | 4-263130 |

[51] Int. Cl.$^6$ .......... G03G 5/00; G03G 15/00
[52] U.S. Cl. .......... 355/200; 355/210; 355/211
[58] Field of Search ............... 355/200, 210, 211, 212; 74/574; 188/266, 272; 248/562, 568, 636, 638; 464/180

[56] References Cited

U.S. PATENT DOCUMENTS

| 4,527,883 | 7/1985 | Kamiyama | 355/211 |
| 4,561,763 | 12/1985 | Basch | 355/200 |
| 4,563,605 | 1/1986 | Gerber | 74/574 X |
| 4,823,160 | 4/1989 | Ikuta et al. | 355/211 |
| 4,848,183 | 7/1989 | Ferguson | 74/574 |
| 5,019,861 | 5/1991 | Surti | 355/200 |
| 5,090,668 | 2/1992 | Hamada | 74/574 X |
| 5,119,128 | 6/1992 | Cherian | 355/200 |
| 5,205,190 | 4/1993 | Kohring | 74/574 |
| 5,239,886 | 8/1993 | Kohring | 74/574 |
| 5,253,740 | 10/1993 | Kohno et al. | 74/574 X |
| 5,299,468 | 4/1994 | Withers | 74/574 |
| 5,303,004 | 4/1994 | Maruyama et al. | 355/200 |
| 5,323,211 | 6/1994 | Fujii et al. | 355/200 |
| 5,357,231 | 10/1994 | Miwa et al. | 355/200 |

FOREIGN PATENT DOCUMENTS

408040 1/1991 European Pat. Off.

OTHER PUBLICATIONS

Patent Abstracts of Japan, vol. 9 No. 38 (M-358); Feb. 19, 1985 JPA-59-179,420; Oct. 12, 1984.
Patent Abstracts of Japan, vol. 6 No. 255 (P-162); Dec. 14, 1982 JPA-57-151,955; Sep. 20, 1982.
Patent Abstracts of Japan, vol. 12 No. 114 (P-688; Apr. 12, 1988 JPA-61-242,963; Oct. 23, 1987.
Patent Abstracts of Japan; vol. 15 No. 363 (P-1251); Sep. 12, 1991 JPA-3-140,989; Jun. 14, 1991.
Patent Abstracts of Japan; vol. 16, No. 416 (M-1304); Sep. 2, 1992 JPA-4-140,536.

*Primary Examiner*—Matthew S. Smith
*Attorney, Agent, or Firm*—Jordan B. Bierman; Bierman and Muserlian

[57] ABSTRACT

A driving mechanism for rotating a rotary body in use with an image forming apparatus such as a copying machine or a printer. The mechanism includes: a rotary body having an axis on a driving shaft; a driving mechanism, including a gear chain, for rotating the rotary body; a first dynamic damper, located at a first side of the rotary body on the axis, having a first specific frequency band for absorbing a vibration of the rotary body; and a second dynamic damper, located at a second side which is opposite to the first side on the axis, having a second specific frequency band for absorbing the vibration of the rotary body.

28 Claims, 15 Drawing Sheets

FIG. 19-A
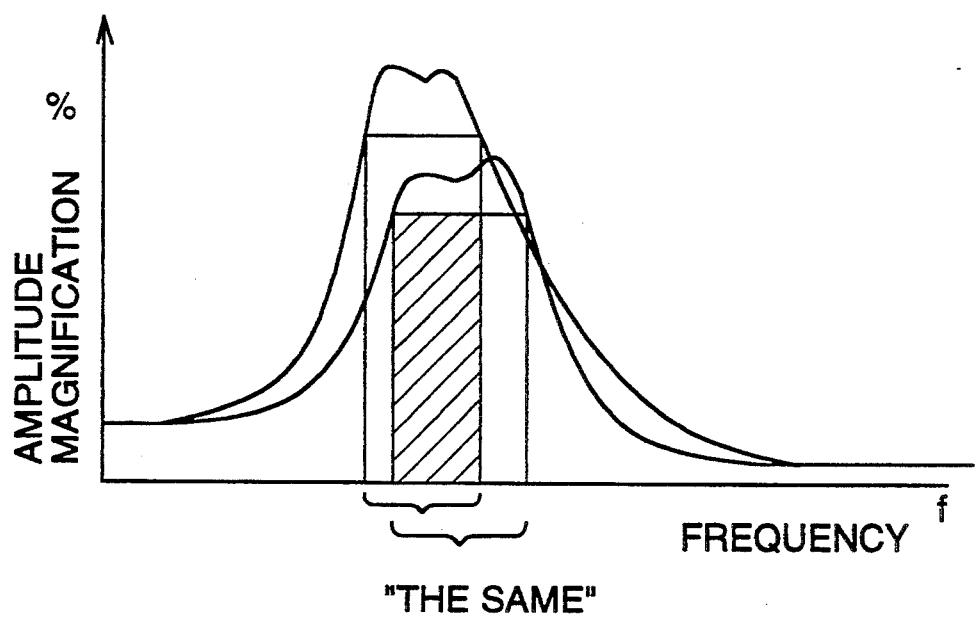
"THE SAME"
FIG. 19-B
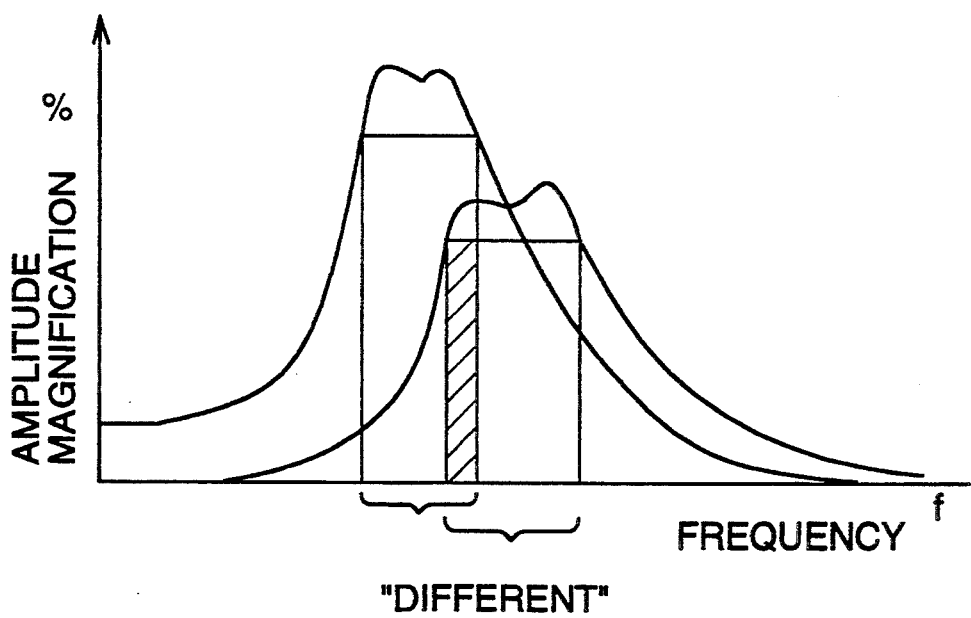
"DIFFERENT"

DRIVING APPARATUS FOR A ROTARY BODY IN USE WITH AN IMAGE FORMING APPARATUS

BACKGROUND OF THE INVENTION

The present invention relates to an image forming output apparatus such as a digital color copying machine, a digital color printer, and the like to which an electrophotographic process is applied.

In a copying machine and a printer to which an electrophotographic process is applied, an image is formed in the following manner: a cylindrical photoreceptor or a belt-shaped photoreceptor is rotated and electrostatic latent images are formed successively on the surface thereof; black toner and, in the case of a color image, other color toners are caused to adhere to the formed electrostatic latent images for development; and they are transferred onto a recording sheet, thus, the image is obtained. In this specification, the photoreceptor drum and a driving roller for the belt-shaped photoreceptor in the image output apparatus are referred to as a rotary body.

Accordingly, when the rotating speed of the photoreceptor is varied for some reasons, jittering or an uneven image is caused on the outputted image. These phenomena have remarkably appeared especially in the digital system electrophotographic technology employing scanning by means of a semiconductor laser for writing images on a photoreceptor. Fluctuation in rotating speed of the photoreceptor has caused speed fluctuation of a writing system in the subsidiary scanning direction to create a slight difference in the distance between writing lines, contributing to the remarkable deteriorations of the image quality.

Conventionally, when designing the driving system for use in a copying machine or a printer, the main consideration has been put on how the objects driven by the driving device are appropriately located in the allowable space, while satisfying the values of the line speed or number of revolutions determined by the product specifications. That is, the following are main concerns: the method by which the driving power is transmitted from a driving power source to a driven object; and mechanical elements for power transmission.

Accordingly, in the case of jittering and rotational fluctuation caused in the finished product, the cause has been investigated, and the following remedies have been taken to change a bearing for a drive shaft of the photoreceptor to one made of sintered metal; to attach a flywheel on the drive shaft of the photoreceptor; to apply a brake, in which a spring is combined with a friction material on the rotary shaft of the photoreceptor drum; to improve the accuracy of a gear; or to use a helical gear with various kinds of helical angles.

However, in the development of a digital type image output apparatus, strict reproducibility of a one dot line written by a laser beam is required with an improvement of the apparatus performance, and accuracy required on the driving system has rapidly become strict. The accuracy required in this case is a level at which the uniformity of laser writing in the subsidiary scanning direction is assured in relation to the visual sensitivity of a visual organ. In order to accomplish this accuracy, it is the most essential technical theme to make the photoreceptor driving system highly accurate.

The main factors of the rotational fluctuation of the driving system have been found to be the following: the rotational fluctuation per one rotation of the rotating shaft of a motor is large, and absolute values of fluctuation components per one rotation of a gear and per one tooth of a gear are large; and fluctuation components and their higher harmonics components cause a resonance phenomenon in relation to the natural oscillation frequency of the driving system.

FIG. 12 shows the power spectrum of speed fluctuation in the driving system of conventional apparatuses. Fluctuation components of a gear according to the line speed proper to the apparatus are 176 Hz in the case of a gear directly coupled to the motor, 64 Hz in the case of a second shaft, and 25 Hz in the case of a gear directly coupled to a drum, and in this case, a higher harmonic component of 50 Hz is shown (not shown in a figure). Further, a component of a rotation of the gear directly coupled to the motor is 22 Hz, and its higher harmonic component of 44 Hz is shown.

FIG. 13 shows an example in which a transfer function for obtaining numerically the natural frequency of the driving system was measured. In this case, the measurement was conducted in the following way: an output of an impact excitation hammer, and an output of a piezoelectric type pick-up sensor, provided on one end of a photoreceptor drum so that the fluctuation of the acceleration in the rotation direction may be measured, were connected with a dual channel type FFT analyzer; and a Fourier spectrum ratio in each of them was obtained. From FIG. 13, the following can be found: a peak of the natural frequency of the present driving system is in the vicinity of 45 Hz; and areas of a high level transfer function are extended to cover the range of 30 to 60 Hz.

FIG. 14 shows the fluctuation component spectrum superimposed on the transfer function. In the driving system, it can be found from the drawing that a peak of the transfer function and the position of a frequency area where the fluctuation component and its second harmonics exist, are overlapped. That is, it has been found that the present driving system is one amplifying the fluctuation components (generating resonance).

Actually, when measurement data from three apparatuses each being equipped with the present driving system were investigated, the fluctuation of rotation of the photoreceptor showed values of 5 to 8%.

The present invention has been achieved in view of the foregoing, and its object is to provide a driving device for a rotary body wherein fluctuation rotation of a driving roller for a rotary body used in an image output apparatus is totally reduced from a low frequency region of several Hz—ten-odd Hz to a region of hundreds Hz—one thousand and several hundred Hz, and thereby an excellent color image free from unevenness, jitter, doubling and color shading can be obtained.

SUMMARY OF THE INVENTION

For solving the problems mentioned above, the invention is characterized in that two dynamic dampers each having different specific frequency band are provided at locations each being in the vicinity of each end of said rotary body, in an image output apparatus comprising a driving system composed of a rotary body, namely, a photoreceptor drum or a driving roller for a belt-shaped photoreceptor, a motor for driving the driving system and a power-transmission system.

Further, two dynamic dampers mentioned above are characterized in that the specific frequency bands thereof are either the same or different.

Two dynamic dampers mentioned above are further characterized in that an inequality of $f1<f2$ is satisfied when f1 represents a specific frequency component of the dynamic damper provided on the side of the power-transmission system and f2 represents that of the dynamic damper provided on the side opposite to the power-transmission system.

In the present invention, a dynamic damper is provided on a rotary body, namely on a photoreceptor drum or a driving roller for a belt-shaped photoreceptor, thereby to generate electromotive force opposite to a vibration of the driving system transmitted to the photoreceptor so that the vibration of the photoreceptor may be suppressed. In this manner, fluctuation of rotation of the driving roller for a photoreceptor can be totally reduced, from low cycles to high cycles, and thereby an excellent color image free from unevenness, jitter, doubling and color shading can be obtained.

Further, the present invention is characterized in that the rotary body is connected with viscous and elastic materials or with elastic materials and a part of the viscous and elastic materials or the elastic materials is connected with the driving shaft of the rotary body to form a dynamic damper whose inertia member is substantially the above-mentioned rotary body itself in an image output apparatus comprising a driving system composed of a rotary body and a driving shaft for rotating the rotary body, a motor for driving the driving system and a power-transmission system.

The invention is further characterized in that the rotary body mentioned above is a photoreceptor drum.

The invention is still further characterized in that the above-mentioned rotary body is a driving roller that drives a belt-shaped photoreceptor.

In the present invention, a dynamic damper is provided on a rotary body, namely on a photoreceptor drum or a driving roller for a belt-shaped photoreceptor, thereby to generate electromotive force opposite to a vibration of the driving system transmitted to the photoreceptor so that the vibration of the photoreceptor may be suppressed. In this manner, fluctuation of rotation of the driving roller for a photoreceptor drum or a belt-shaped photoreceptor can be totally reduced, from low cycles to high cycles, and thereby an excellent color image free from unevenness, jitter, doubling and color shading can be obtained.

Further, the present invention is represented by an image forming apparatus having therein a driving system composed of a rotary body and a driving shaft for rotating the rotary body, a motor for rotating the driving system and a power transmission system wherein a flange portion of the rotary body is constituted with a substantial dynamic damper including an inertia member and an elastic member or an inertia member and a viscoelastic member.

The present invention is further characterized in that, when f1 represents specific frequency component of a dynamic damper provided the power transmission system for the rotary body and f2 represents that of a dynamic damper provided on the opposite side against the power transmission system, an inequality of $f1<f2$ is satisfied.

The present invention is further characterized in that a dynamic damper provided on the side of the power transmission system for the rotary body is supported rotatably on the aforementioned driving shaft and a dynamic damper provided on the opposite side against the power transmission system is affixed on the aforementioned fixed shaft.

When a dynamic damper is provided on the driving roller for a rotary body such as a photoreceptor drum or a belt-shaped photoreceptor in the present invention, vibromotive force that is opposite to the vibration of the driving system propagated to the photoreceptor is generated to control the vibration.

When dynamic dampers are applied on both flanges of the rotary body and each of their specific frequency components f1 and f2 is deviated by a certain value, the vibration for fluctuation component in a broader range can be controlled.

It is further possible to enhance an effect of vibration control by providing a dynamic damper for fluctuation component with high specific frequency on the opposite side against the power transmission system. Thus, rotation fluctuation of the driving roller for the rotary body such as a photoreceptor drum or a belt-shaped photoreceptor is totally reduced over the range from those with a greater cycle to those with a smaller cycle, and thereby it is possible to obtain a beautiful color image that is free from unevenness and jitter in terms of image quality and free from color doubling and color shading.

Further, in the present invention, in a driving device for a rotary body in an image output apparatus comprising the rotary body, a driving system for rotating the rotary body, a motor for driving the driving system and a power-transmission system, it is characterized that ring-shaped inertia members are connected to the internal surface at both ends of the rotary body, a viscous elastic member or an elastic member is connected to the internal surface of each inertia member, and the viscous elastic members or the elastic members are connected to the driving shaft, thereby to organize a dynamic damper.

It is further characterized in the invention that an inequality of $f1<f2$ is satisfied when f1 represents a specific frequency component of the dynamic damper provided on the rotary body to be located at the side of the power-transmission system and f2 represents that of the dynamic damper provided on the rotary body to be located at the side opposite to the power-transmission system.

In the present invention, a dynamic damper is provided on a rotary body by connecting an inertia member to an internal surface of a rotary body in an image output apparatus, thereby to generate electromotive force opposite to a vibration of the driving system transmitted to a photoreceptor so that the vibration of the photoreceptor may be suppressed. In this manner, fluctuation of rotation of a rotary body can be totally reduced, from low cycles to high cycles, and thereby an excellent color image free from unevenness, jitter, doubling and color shading can be obtained.

In this invention, the specific frequency band means the frequency band that the dynamic damper absorbs the vibration at a frequency thereof. When the dynamic damper is designed, the specific frequency band of the dynamic damper is specified by the elements such as the ring diameter, the mass weight, the rubber size, and the rubber solidity.

The specific frequency band of the dynamic damper is generally expressed by the amplitude magnification curve such as the FIG. 18. The specific frequency band, in this invention, is defined as the band of the amplitude magnification which is more than 80% of the peak of the amplitude magnification curve as shown in the FIG. 18.

When the specific frequency components are either the same or different, each of the components actually points out the peak of its amplitude magnification characteristics. However, when the specific frequency bands are either the same or different, the following definition is applied:

Since the specific frequency band is shown by the area in the amplitude magnification curve, if the area showing the specific frequency band of one dynamic damper overlaps more than 50% of the area showing that of another dynamic damper as shown in FIG. 19A, it is expressed as "the same" in this invention.

On the other hand, if the area showing the specific frequency band of one dynamic damper overlaps less than 50% of the area showing that of another dynamic damper as shown in FIG. 19B, it is expressed as "different" in this invention.

BRIEF DESCRIPTION OF THE DRAWINGS

FIG. 19-A, and 19-B are graphs showing the definitions of the overlaps of two dynamic dampers.

DETAILED DESCRIPTION OF THE INVENTION

Figure 10:
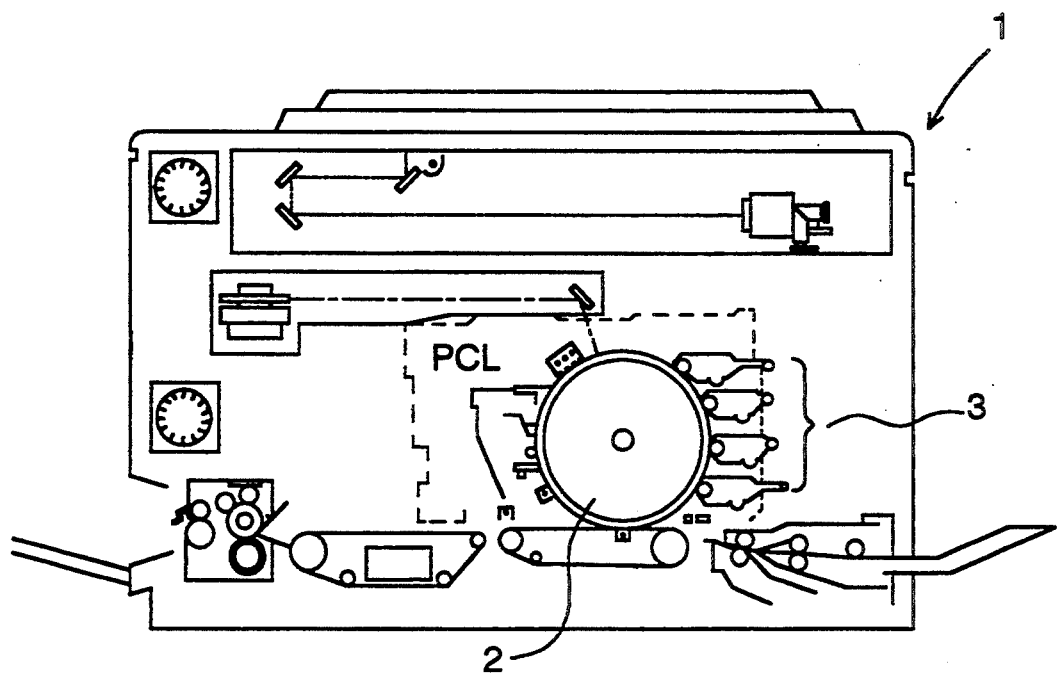
FIG. 10 is a sectional view showing an electrophotographic image output apparatus of the invention.

FIG. 10 represents a diagram showing the schematic structure of an electrophotographic image output apparatus wherein a driving device for a rotary body is employed for a photoreceptor drum. Electrophotographic image output apparatus 1 is provided therein with photoreceptor drum 2 as a rotary body, developing unit 3 and a driving mechanism that drives the photoreceptor drum 2.

The driving mechanism (not shown), which drives the photoreceptor drum 2, is composed of driving motor and power-transmission system linked thereto, namely, gear train, and the last gear 10 in the gear train is engaged with driving gear 11 on the photoreceptor drum 2. The photoreceptor drum 2 is made of a base material of aluminum to be of a cylindrical shape, and its side is coated with organic photoreceptor material. The base material is formed so that its wall thickness may be thin, and flanges 12 affixed on both ends of the base material are fixed on driving shaft 13. The driving shaft 13 is supported rotatably by bearings (not shown), and driving gear 11 is affixed on the end of the driving shaft 13.

Figure 1:
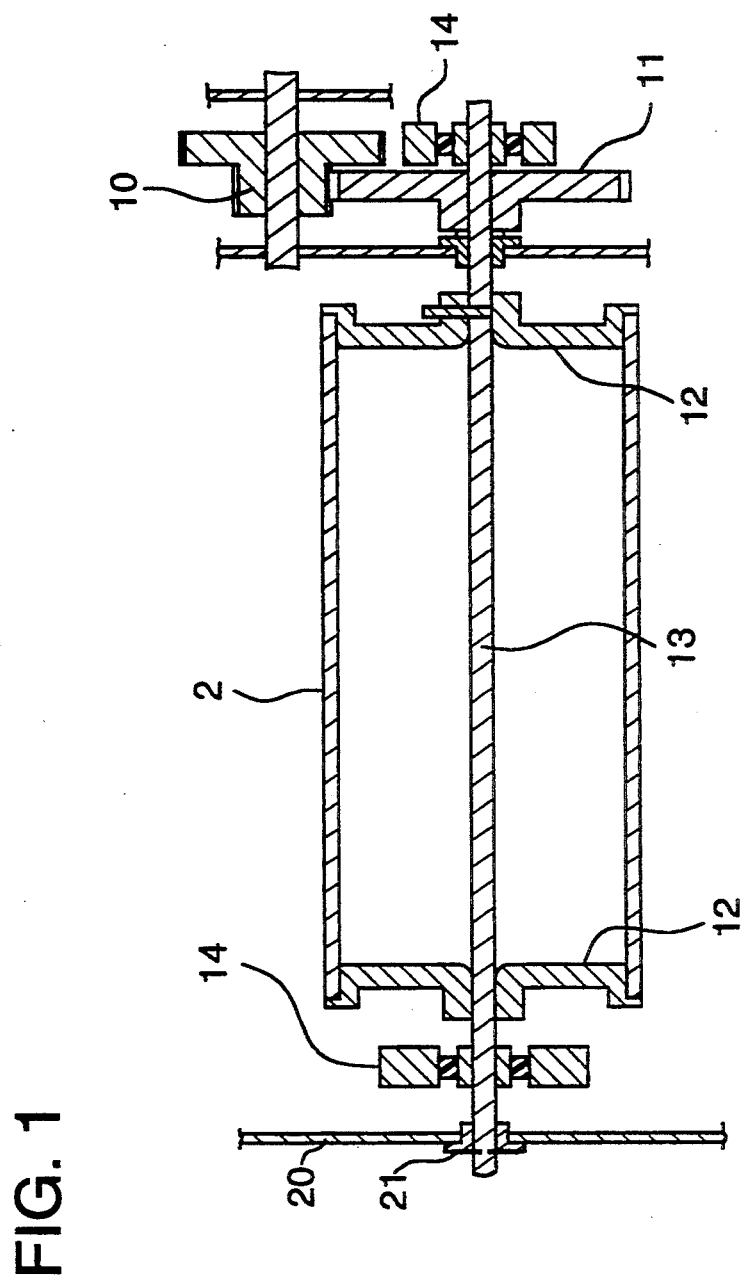
FIG. 1 is a sectional view showing the first embodiment of the driving system for a photoreceptor.

FIG. 1 is a sectional view showing an example of a driving device for a photoreceptor drum which is a rotary body of the first embodiment of the invention.

In the first embodiment mentioned above, dynamic damper 14 is affixed on photoreceptor drum 2. The dynamic damper is composed of an outer ring-shaped inertia member made of metal and a core member located at the center both connected by a ring-shaped viscous and elastic or elastic member. The viscous and elastic member has elasticity such as that of rubber, for example, and a viscous property. Due to the dynamic damper affixed on a driving shaft for a photoreceptor, electromotive force in the direction opposite to that of a driving system that drives the shaft for a photoreceptor is generated, and thereby vibration-absorbing operation, namely, vibration-controlling operation is carried out.

Two dynamic dampers 14 are affixed on driving shaft 13 in a way that each of them is positioned to be outside photoreceptor drum 2 which is a rotary body and to be in the vicinity of each of flanges 12 on both sides of the photoreceptor drum 2.

Further, an arrangement was made in the example so that vibration control by means of a dynamic damper for low frequency fluctuation components may be effective on the side of a power-transmission system, namely, on the front side of a rotary body such as, for example, a photoreceptor drum, while that for high frequency fluctuation components may be effective on the side opposite to the power-transmission system, namely, on the rear side of the rotary body. For example, an arrangement was made in the example so that an inequality of $f1 < f2$ may be satisfied when f1 represents the specific frequency component of the dynamic damper on the side of a power-transmission system and f2 represents that on the side opposite to the power-transmission system.

Therefore, the specific frequency components of two dynamic dampers can be different. However, even if the specific frequency components of two dynamic dampers are the same, an effectiveness can be expected.

Incidentally, it is preferable that an inequality of $0.05 < \mu' < 1$ is satisfied when $\mu'$ represents the moment of inertia ratio of the dynamic damper.

Figure 15:
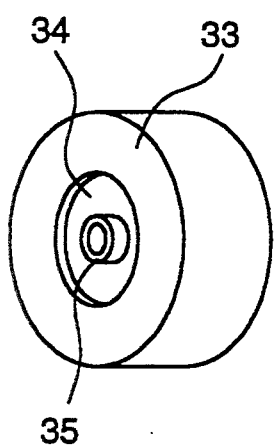
FIG. 15 is a diagonal view showing the dynamic damper used in the first embodiment.

FIG. 15 shows the structure of the dynamic damper used in the first embodiment. In the figure, 33 is an inertia member, 34 is a rubber member, and 35 is a joint member to the photoreceptor drum shaft.

Figure 16:
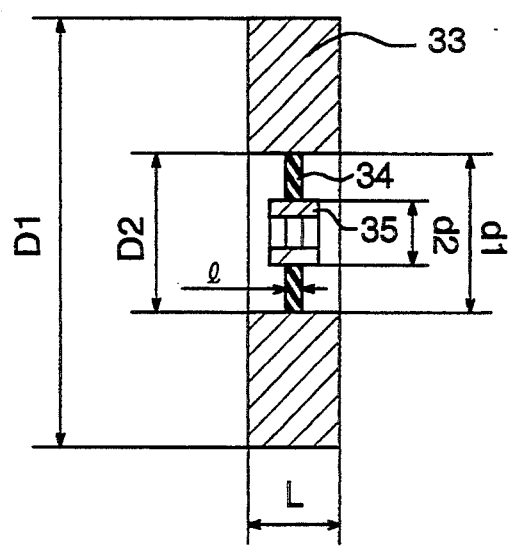
FIG. 16 is a sectional view showing the dynamic damper used in the first embodiment.

FIG. 16 is the sectional view of the dynamic damper used in the first embodiment. In the figure, D1 represents the outer diameter of the inertia member, D2 represents the inner diameter of the inertia member, L represents the depth of the inertia member, d1 represents the outer diameter of the rubber member, d2 represents the inner diameter of the rubber member, and l represents the depth of the rubber member.

In the first embodiment, the dynamic damper 1 having the specific frequency component at 25 Hz, which is a gear component of the driving gear chain for the photoreceptor drum, is provided at the side of the driving transmission system. Also, the dynamic dumper 2 having the specific frequency component at 64 Hz, which is a gear component of the motor driving gear chain, is provided at the opposite side to the driving transmission system side.

The aforementioned dynamic dampers 1 and 2 have the moment of inertia ratio of 0.4, and the component numbers of these dampers are shown in the following chart.

|  | D1 | D2 | L | d1 | d2 | l | Rubber Hardness | Object Frequency |
|---|---|---|---|---|---|---|---|---|
| Dynamic Damper 1 | 134 | 40 | 28 | 40 | 30 | 16 | 62 | 25 |
| Dynamic Damper 2 | 134 | 40 | 28 | 40 | 35 | 25 | 75 | 64 |

In the above chart, the unit of D1, D2, L, d1, d2, and l is mm, the unit of the rubber hardness is °(degree), and the unit of the object frequency is Hz.

Figure 17:
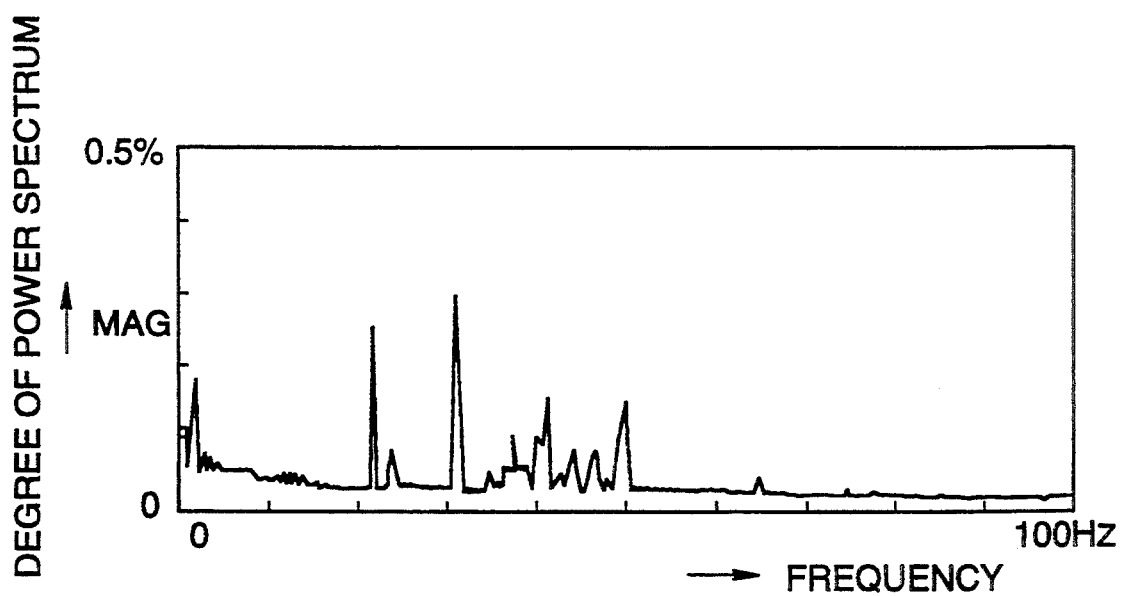
FIG. 17 is a graph showing the power spectrum of the speed fluctuation of the photoreceptor drum in the first embodiment.
Figure 18:
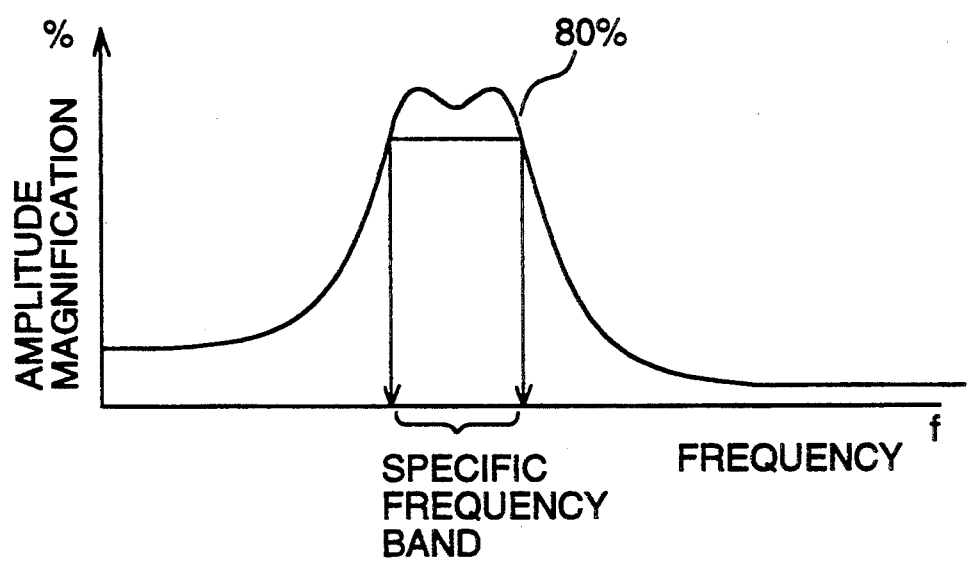
FIG. 18 is a graph showing the amplitude magnification curve of a dynamic damper.

FIG. 17 shows the power spectrum of speed fluctuation in the driving system of the first embodiment. Comparing to the power spectrum of speed fluctuation in the driving system of the conventional model shown in FIG. 12, the first embodiment is confirmed to decrease 76% at 25 Hz corresponding to a gear of the gear chain for driving the drum photoreceptor, and 12% at 64 Hz corresponding to a gear of the motor driving gear chain.

Further, in the first embodiment, the specific frequency components of the dynamic dampers are specified by paying attention to the vibrations at 25 Hz corresponding to a gear of the gear chain for driving the drum photoreceptor, and at 64 Hz corresponding to a gear of the motor driving gear chain. However, it is possible to specify the specific frequency components according to the design of the object system and its vibration control.

Further, the dynamic dampers specified to the above specific frequency components are not limited to the above described structure, but are composed in various ways.

Figure 2:
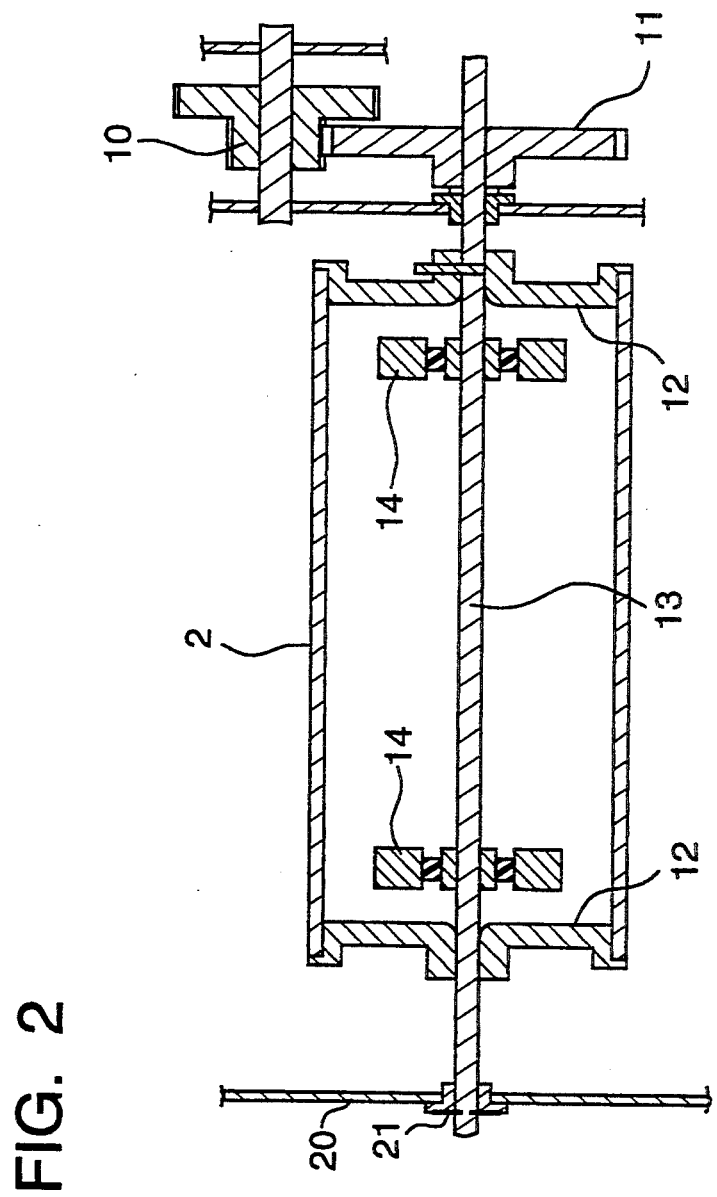
FIG. 2 is a sectional view showing the second embodiment of the driving system for a photoreceptor.

FIG. 2 is the sectional view showing the driving apparatus of the photoreceptor drum as a rotary body according to the second embodiment of the present invention.

In the embodiment shown in FIG. 2, two dynamic dampers 14 are affixed on driving shaft 13 in a way that each of them is positioned to be inside photoreceptor drum 2 and to be in the vicinity of each of flanges 12 on both sides of the photoreceptor drum 2. The other part of the structure is the same as that of the aforementioned first embodiment.

Figure 3:
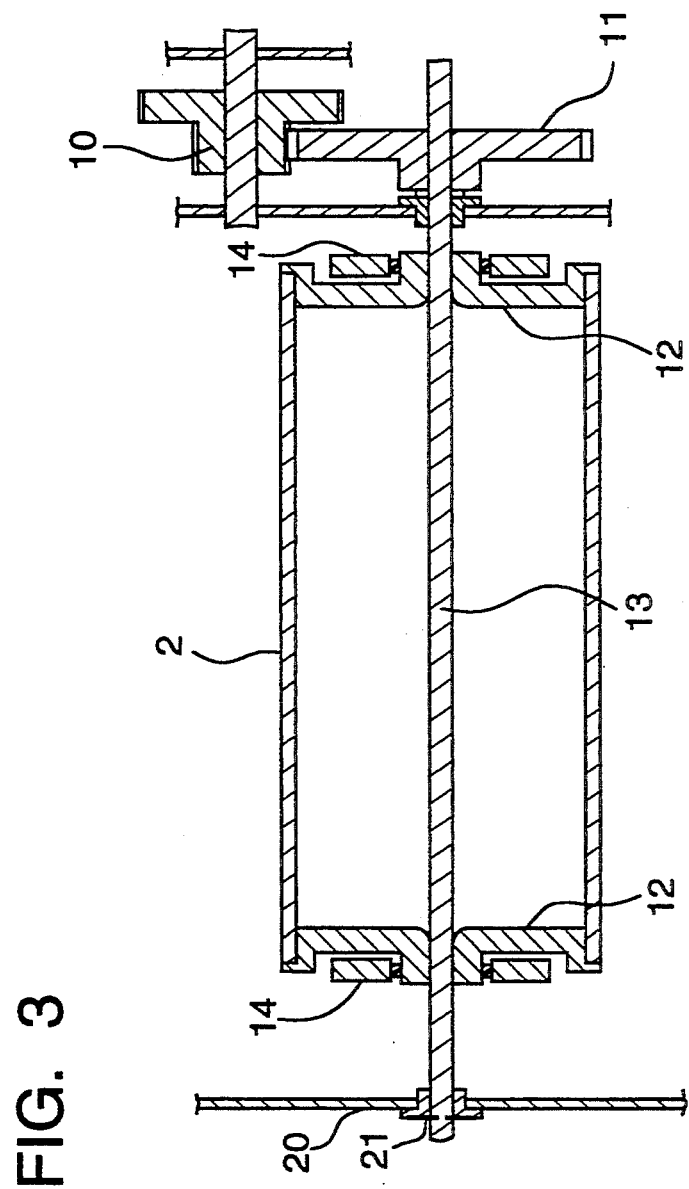
FIG. 3 is a sectional view showing the third embodiment of the driving system for a photoreceptor.

FIG. 3 is the sectional view showing the driving apparatus of the photoreceptor drum as a rotary body according to the third embodiment of the present invention.

In the third embodiment shown in FIG. 3, each of two dynamic dampers 14 is affixed on the boss of each flange 12 of photoreceptor drum 2 to be outside the photoreceptor drum 2, and the boss plays a role of the core member of the dynamic damper. The other part of the structure is the same as that of the aforementioned first embodiment.

In the first, the second, and the third embodiments, the photoreceptor itself is the rotary body. However, the photoreceptor can not only be a rotary body, but also be the belt-shaped photoreceptor 25 shown in FIG. 11. This invention can be applied to the image driving apparatus such as the belt-shaped photoreceptor 25 which is driven by multiple rollers shown as the driving roller 26. Even in this case, it is possible to rotate the driving roller 26 without fluctuation of rotation by applying the example mentioned above to the driving roller 26, thereby the belt-shaped photoreceptor 25 can be moved at a constant speed, and image quality is improved accordingly.

Figure 4:
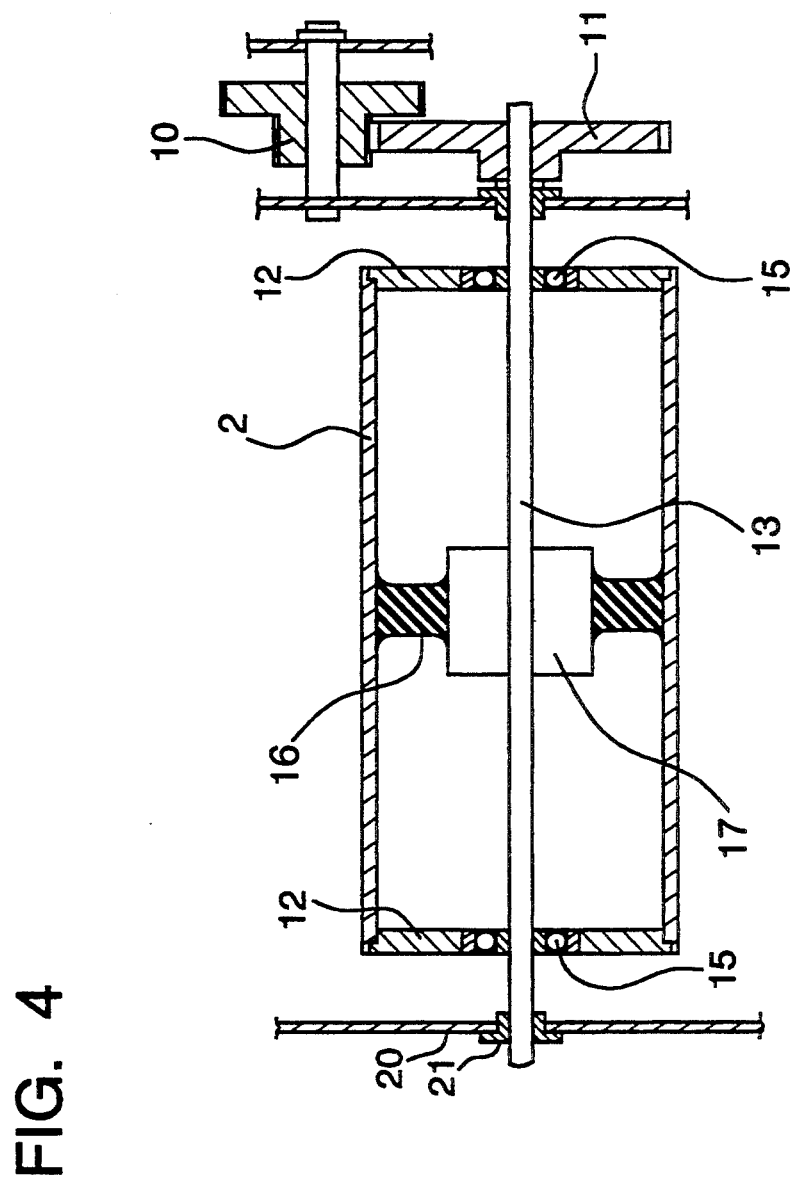
FIG. 4 is a sectional view showing the fourth embodiment of the driving system for a photoreceptor.

FIG. 4 is a sectional view showing an example of a driving device for a rotary body of the fourth embodiment of the invention.

In the fourth embodiment, photoreceptor 2 prepared by coating or evaporating photoconductive materials on the circumferential surface of a rotary body such as a drum is affixed to flange 12 supported rotatably on driving shaft 13 which is concentric with the ball bearing 15.

Inside the photoreceptor 2, a ring-shaped viscous and elastic or elastic material 16 is connected to the internal surface of the photoreceptor 2.

Further, ring-shaped core member 17 is connected to the internal surface of the viscous and elastic or elastic material 16.

The central hole of the core member 17 is connected to the driving shaft 13.

The photoreceptor 2, the viscous and elastic or elastic material 16 and the core member 17 all connected to each other as described above form a dynamic damper. The photoreceptor 2 serves as an inertia member of the dynamic damper.

The members mentioned above are connected through various means including mechanical and chemical means such as welding, gluing or screwing.

Figure 5:
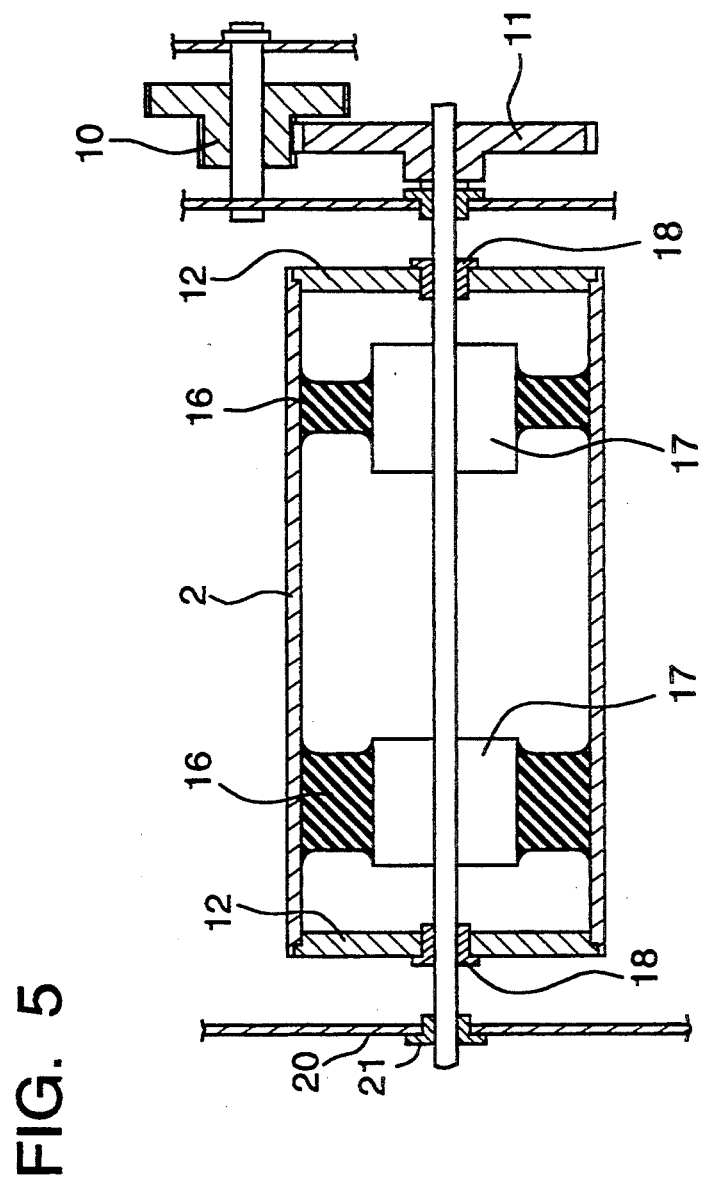
FIG. 5 is a sectional view showing the fifth embodiment of the driving system for a photoreceptor.

FIG. 5 is the sectional view showing the driving apparatus of the photoreceptor drum as a rotary body according to the fifth embodiment of the present invention.

Although the fourth embodiment has one dynamic damper, the fifth embodiment has two dynamic dampers. The photoreceptor 2 is affixed to flange 12 supported rotatably on driving shaft 13 which is concentric with the plain bearing 18. The other part of the structure is the same as that of the aforementioned fourth embodiment. The number, size and distance of dynamic dampers depend on design specifications for vibration control.

Due to the structure mentioned above, vibration of the photoreceptor 2 is controlled, resulting in the movement of the photoreceptor 2 at constant speed.

Figure 12:
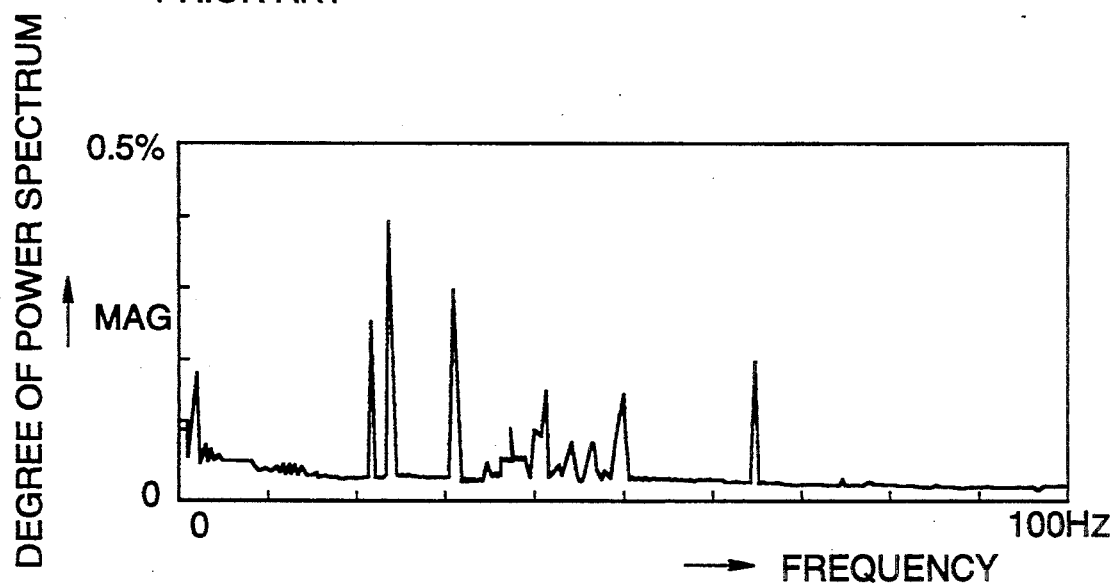
FIG. 12 is a graph showing power spectrum of speed fluctuation of a conventional photoreceptor drum.
Figure 13:
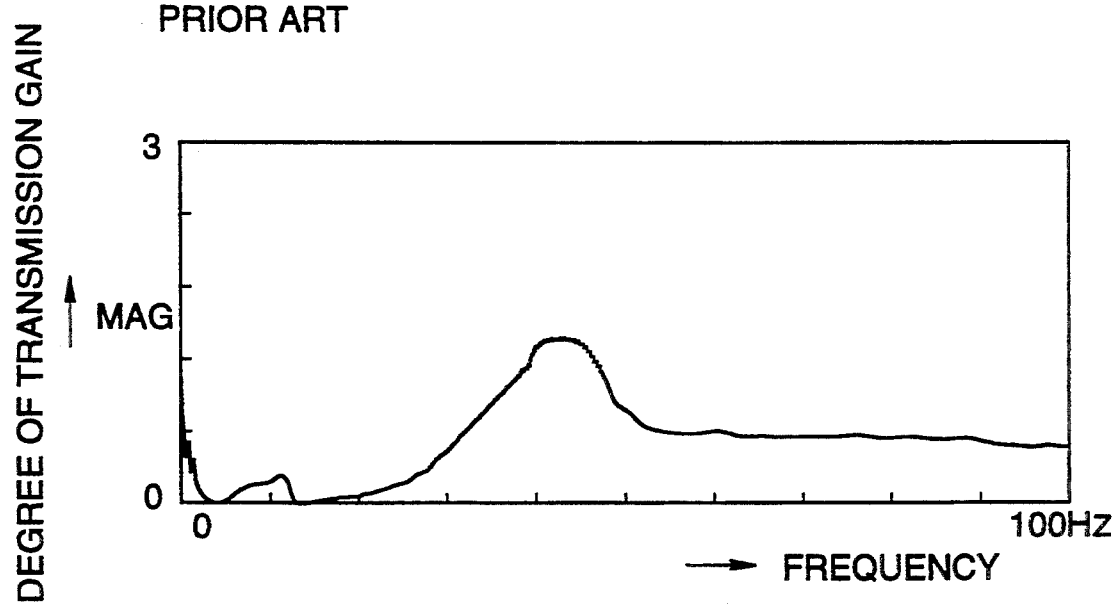
FIG. 13 is a graph showing the transfer function of the conventional driving system for a photoreceptor.
Figure 14:
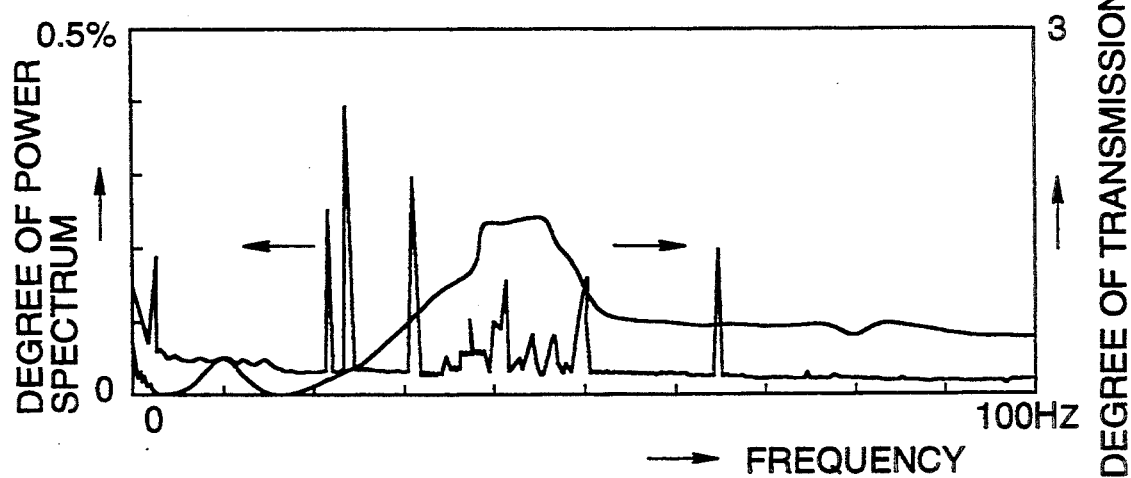
FIG. 14 is a graph showing power spectrum of speed fluctuation of a conventional photoreceptor and the transmission function of a driving system for the photoreceptor together.

Though, in the fourth and fifth embodiments, a rotary body itself is photoreceptor 2 in the above description, an image output apparatus wherein belt-shaped photoreceptor 25 is employed as shown in FIG. 12 and a rotary body of the invention is not the photoreceptor but driving roller 26 that drives the photoreceptor 25 may also be used. Even in this case, it is possible to rotate the driving roller 26 without fluctuation of rotation by applying the example mentioned above to the driving roller 26. Since the photoreceptor 25 can be moved at a constant speed, image quality to be outputted can be improved.

Figure 6:
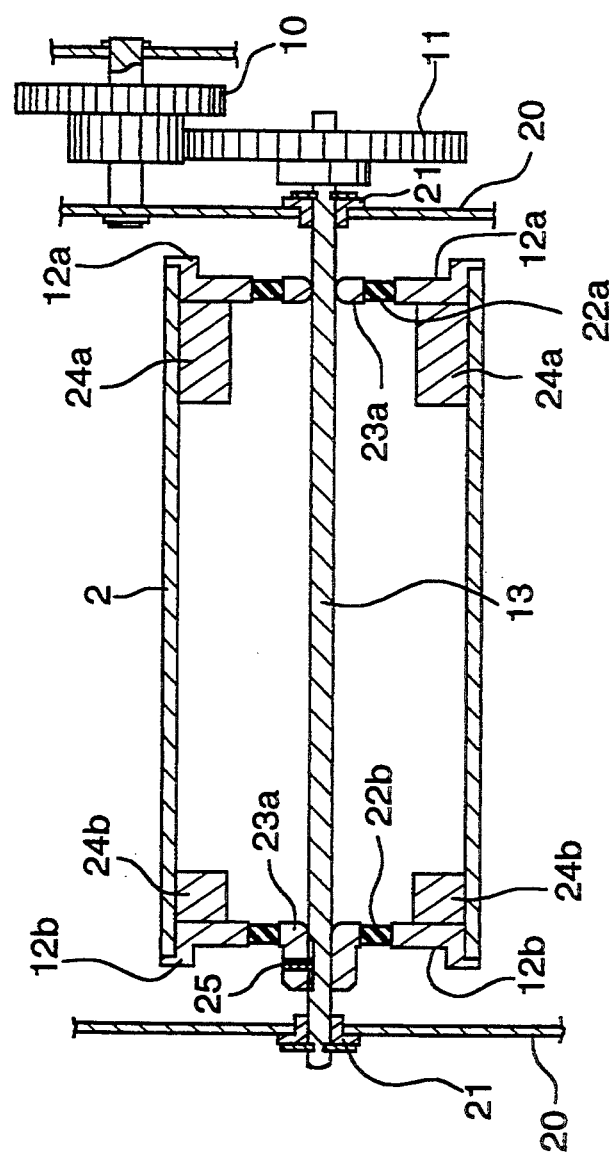
FIG. 6 is a sectional view showing the sixth embodiment of the driving system for a photoreceptor.

FIG. 6 is the sectional view showing the driving apparatus of the photoreceptor drum as a rotary body according to the sixth embodiment of the present invention.

In the sixth embodiment, a power transmission system is provided on the right side of the photoreceptor drum 2.

The photoreceptor drum 2 is made of a cylindrical base material of aluminum. Both ends of the photoreceptor drum are provided with flanges 12a and 12b, and the side of the cylindrical drum is coated with an organic light-sensitive material.

Elastic member or viscoelastic member 22a is affixed inside the flange 12a which is positioned on the right side of the photoreceptor drum 2, and ring-shaped core member 23a is affixed inside the elastic or viscoelastic member 22a.

Elastic member or viscoelastic member 22b is affixed inside the flange 12b which is positioned on the left side of the photoreceptor drum 2, and ring-shaped core member 23b is affixed inside the elastic or viscoelastic member 22b.

Driving shaft 13 is provided so that it passes through the center of the core member 23a and that of the core member 23b, namely the center of the photoreceptor drum 2. Both ends of the driving shaft 13 are supported rotatably by bushings 21 on panel 20. The aforementioned driving gear 11 is affixed on the end of the driving shaft 13 on the side of the power transmission system, and the driving gear 11 is engaged with final gear 10.

The core member 23a is supported rotatably on the driving shaft 13. Though the core member 23a slides while being in direct contact with the driving shaft 13, a ball bearing or a slide bearing may also be provided between the core member 23a and the driving shaft 13. The core member 23b, on the other hand, is affixed on the driving shaft 13 by means of pin 25.

Inside the photoreceptor drum 2, ring-shaped inertia members 24a and 24b are affixed respectively on the flanges 12a and 12b.

A flange portion which is closer to the power transmission system and is composed of flange 12a, inertia member 24a, viscoelastic member (or elastic member) 22a and core member 23a constitutes a dynamic damper substantially and thereby controls vibration.

Employing a system wherein natural frequency relating to the rotation of a photoreceptor-driving system such as a driving roller for a photoreceptor drum or a belt-shaped photoreceptor is shifted to a region of low frequencies in a range from several hertz to several tens hertz, the sixth embodiment further reduces fluctuation components by applying the aforementioned dynamic damper on a specific frequency components which finally remain after identifying fluctuation components to be substantial fluctuation of the driving such as fluctuation components of a single rotation of the motor, those of one rotation of a gear and those of one tooth of the gear.

Incidentally, preferable values of the moment of inertia $\mu'$ of the aforementioned dynamic damper are as follows.

$$0.05 < \mu' < 1$$

When f1 represents a specific frequency component on the power transmission system side and f2 represents that on the opposite side against the power transmission system, the aforementioned dynamic damper is structured so that an inequality of f1<f2 may be satisfied. When each of f1 and f2 is shifted by a certain value as in the foregoing, an effect for controlling vibration for a wider range of fluctuation components can be achieved. The effect is further enhanced with the relation of f1<f2.

Figure 7:
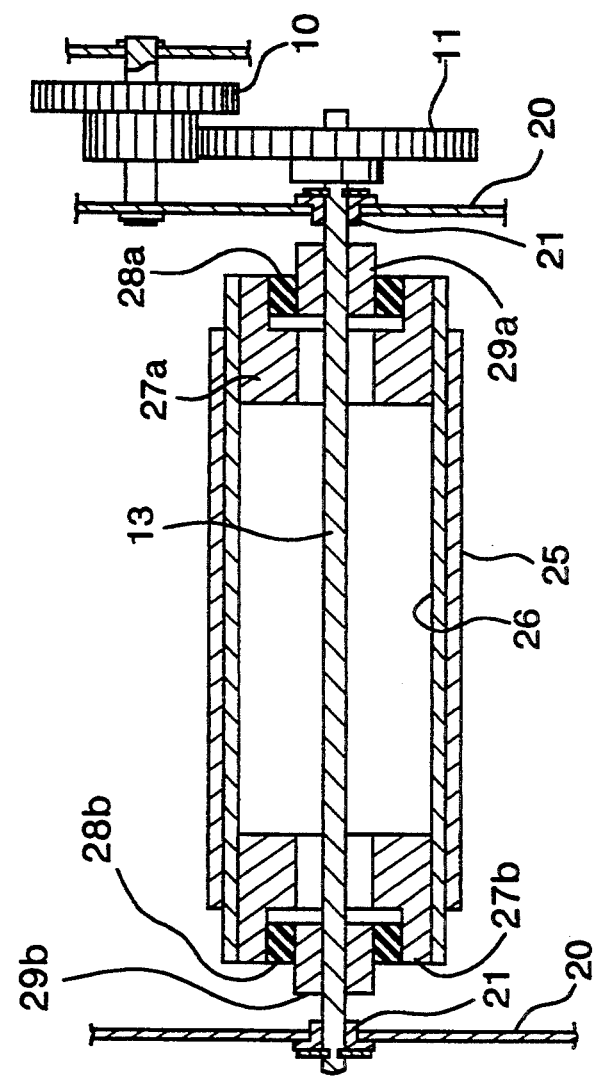
FIG. 7 is a sectional view showing the seventh embodiment of the driving system for a photoreceptor.

FIG. 7 is the sectional view showing the driving apparatus of the photoreceptor drum as a rotary body according to the seventh embodiment of the present invention.

The seventh embodiment is applied to an image forming apparatus wherein the rotary body represents driving roller 26 that drives photoreceptor 25 which is not the rotary body but is belt-shaped, though the photoreceptor 2 in the sixth embodiment is a rotary body. Even in this case, a flange portion of the driving roller 26 closer to the power transmission system comprises core member 29a affixed on the driving shaft 13, viscoelastic member (or elastic member) 28a and inertia member 27a, and this flange portion constitutes a dynamic damper substantially and controls vibration.

Further, a flange portion of the driving roller 26 farther from the power transmission system comprises core member 29b affixed on the driving shaft 13, viscoelastic member (or elastic member) 28b and inertia member 27b, and this flange portion constitutes a dynamic damper substantially and controls vibration.

As a result, it is possible to rotate the driving roller 26 without speed fluctuation. Since the photoreceptor 25 can be caused to travel at a constant speed as stated above, it is possible to improve the quality of a formed image.

Figure 8:
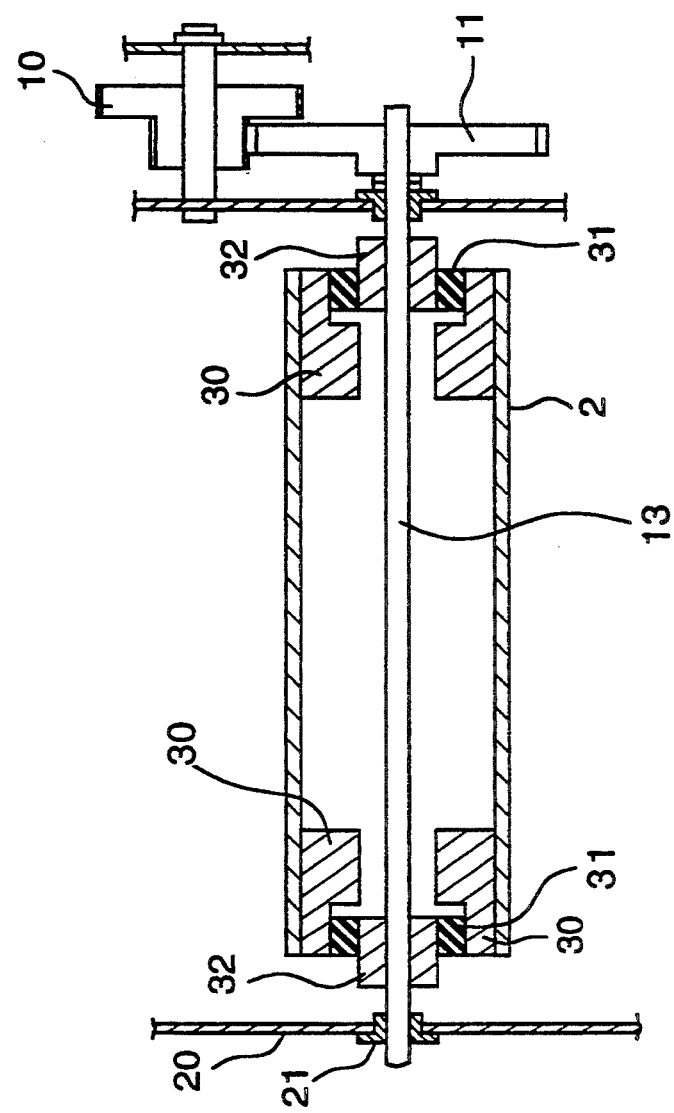
FIG. 8 is a sectional view showing the eighth embodiment of the driving system for a photoreceptor.

FIG. 8 is the sectional view showing the driving apparatus of the photoreceptor drum as a rotary body according to the eighth embodiment of the present invention.

In the eighth embodiment, ring-shaped inertia member 30 is connected to the internal surface of the photoreceptor drum 2, a ring-shaped viscous and elastic member or elastic member 31 is connected to the inner surface of the inertia member, ring-shaped core member 32 is connected to the inner surface of the viscous and elastic member or the elastic member 31, and the core member 32 is also connected to the outer surface of driving shaft 13. The inertia member 30, the viscous and elastic member (or the elastic member) 31 and the core member 32 constitute a dynamic damper.

Figure 9:
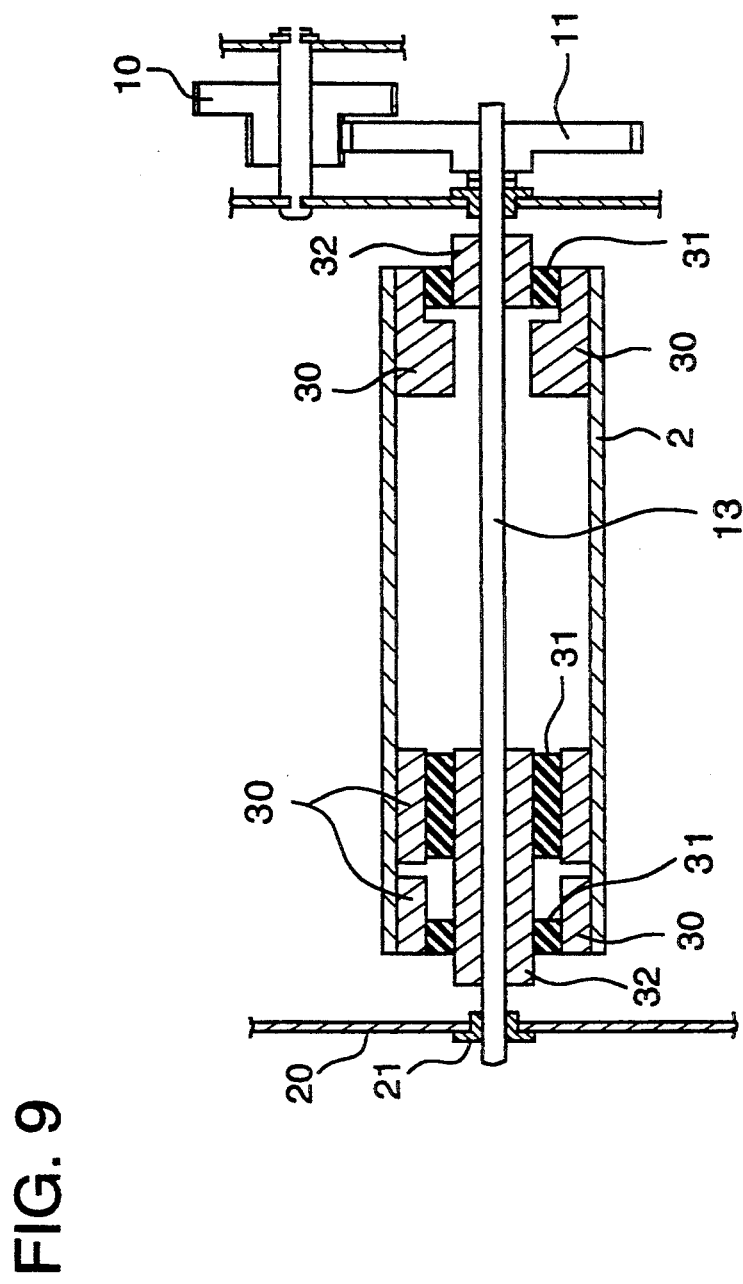
FIG. 9 is a sectional view showing the ninth embodiment of the driving system for a photoreceptor.

FIG. 9 is the sectional view showing the driving apparatus of the photoreceptor drum as a rotary body according to the ninth embodiment of the present invention.

In the eighth embodiment, a dynamic damper is provided at the position near each of both ends of the photoreceptor drum 2; however, in the ninth embodiment, two dynamic dampers are provided at the position near one end of the photoreceptor drum and one dynamic damper is provided on the opposite side. The other part of the structure is the same as that of the eighth embodiment.

In the eighth and ninth embodiments, connection of each member is carried out by means of a welding means, a bonding means or a mechanical means. Quantity and a size of a dynamic damper to be provided are varied properly in accordance with the moment of inertia.

Preferable values for the moment of inertia ratio $\mu'$ of the aforementioned dynamic damper are as follows.

$$0.05 < \mu' < 1$$

When the aforementioned dynamic dampers are provided at positions each being near each of both ends of the photoreceptor drum 2, and when f1 represents the specific frequency component of a dynamic damper positioned on the side of a power-transmission system that is a driving unit and f2 represents that of a dynamic damper on the side opposite to the driving unit, it is possible to control vibration for a wider range of fluctuation frequency by shifting f1 and f2 by a certain value. It is further possible to enhance the effect by providing a dynamic damper for fluctuation components of higher specific frequencies on the side opposite to the driving unit.

Figure 11:
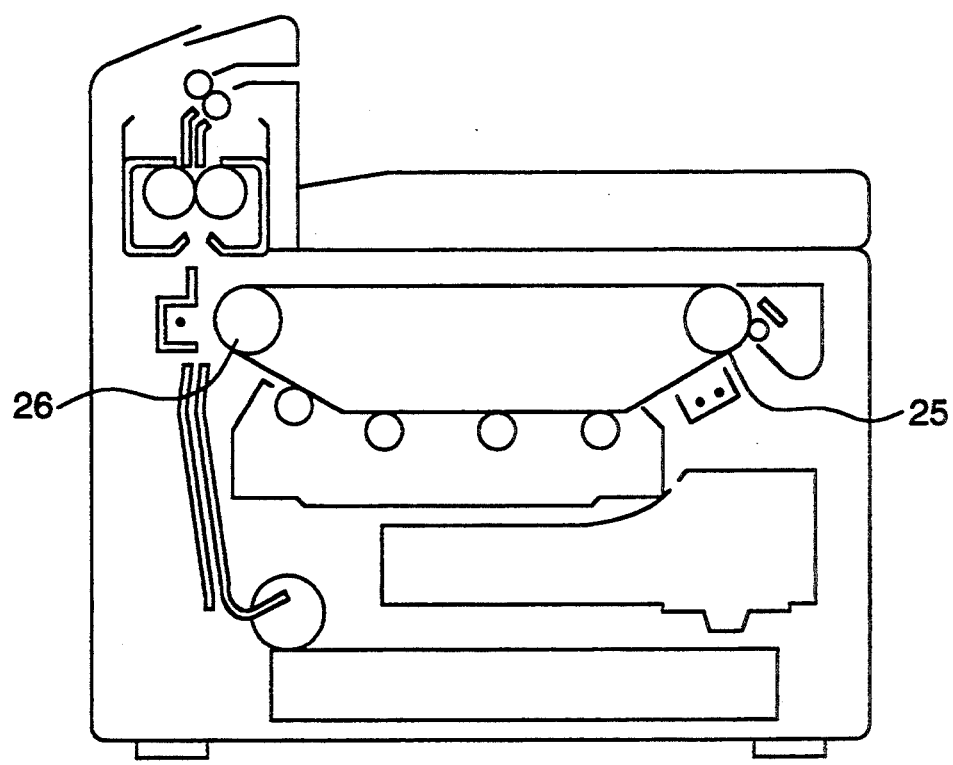
FIG. 11 is a sectional view showing an electrophotographic image output apparatus of the invention.

In the eighth and ninth embodiments, the rotary body itself represents photoreceptor drum 2. However, an image output apparatus wherein photoreceptor 25 is belt-shaped and the rotary body of the invention is driving roller 26 that drives the belt-type photoreceptor 25 as shown in FIG. 11 Even in this case, it is possible to apply the example described above to driving roller 26 to cause the driving roller 26 to rotate without speed fluctuation. Therefore, it is possible to move the photoreceptor 25 at a constant speed, and thereby to improve image quality of outputted images remarkably.

In the second, the third, and the fifth through the eighth embodiments, the dynamic dumper 1 having the specific frequency component at 25 Hz, which is a gear component of the driving gear chain for the photoreceptor drum, is provided at the side of the driving transmission system, and the dynamic damper 2 having the specific frequency component at 64 Hz, which is a gear component of the motor driving gear chain, is provided at the opposite side to the driving transmission system side. As the result of the actual testing of these dynamic dampers attached on a image output apparatus, the similar effect to the first embodiment was obtained.

A driving device for a rotary body of the invention makes it possible to reduce totally the rotation fluctuation of the rotary body. Therefore, the following excellent effects can be shown on an image output apparatus equipped with the driving device: 1. remarkable improvement in image quality, especially, the reduction of image unevenness called jitter or pitch irregularity caused in the subsidiary scanning direction of the writing system can be observed,; 2. the simple and compact mechanism of the driving device of the invention makes it possible to develop a simple and compact apparatus which had to be complex and large-sized in the conventional technology and makes it possible to expect the cost reduction caused thereby, and; 3. reliability of the total system is remarkably enhanced due to the simplified mechanism.

Further, it is possible for the present invention to use the other structures than the described structures for eliminating the speed fluctuation of the driving system. For example of the other structures, a flywheel is coupled with the photoreceptor shaft, a brake system, consisting a spring member and a friction member, is attached to the photoreceptor driving shaft, the gear precision is high-graded, helical gears having various helical angles are applied to the gear chain, and a sliding member is applied to the non-image region of the photoreceptor.

In the actual system, even if above structures are applied to the apparatus, some natural frequencies still often remain in the system. In such a case, the dynamic dampers having the specific frequency components absorbing the natural frequencies can be provided to the system according to the present invention. Therefore, the present invention is still effective to such the system using the above structures.

What is claimed is:

1. A driving apparatus for a rotating photoreceptor drum which is adapted for formation of a toner image on a surface thereof, said driving apparatus comprising:
    a driveshaft for rotating said photoreceptor drum;
    a flange physically connecting said surface with said driveshaft;
    a driving element for rotating said driveshaft;
    a first dynamic damper, at a first side of said photoreceptor drum on said driveshaft, having a first object frequency f1 for absorbing vibration of said surface of said photoreceptor drum;
    a second dynamic damper, located at a second side of said photoreceptor drum which is opposite to said first side, said second damper being on said driveshaft and having a second object frequency f2 for absorbing vibration of said surface of said photoreceptor drum; and
    a power transmission, on said first side, which transmits a driving force of said driving element to said driveshaft.

2. The apparatus of claim 1, wherein said first object frequency f1 is equal to said second object frequency f2.

3. The apparatus of claim 1, wherein said first object frequency f1 is different from said second object frequency f2.

4. The apparatus of claim 3, wherein said object frequency component f1 and said object frequency component f2 satisfy the following equation:

$$f1 < f2.$$

5. The apparatus of claim 1, wherein said first dynamic damper and said second dynamic damper are inside of said drum.

6. The apparatus of claim 1, wherein said first dynamic damper and said second dynamic damper are outside of said drum.

7. A driving apparatus for a rotating photoreceptor drum which is adapted for formation of a toner image on a surface thereof, said driving apparatus comprising:
    a driveshaft for rotating said photoreceptor drum;
    a driving element for rotating said driveshaft;
    a flange physically connecting said surface with said driveshaft; said flange comprising:
        a first dynamic damper, formed as a flange of said photoreceptor drum at a first side of said drum, said first damper having a first object frequency f1 for absorbing vibration of said surface, and
        a second dynamic damper, formed as a flange of said photoreceptor drum at a second side of said drum, which is opposite said first side, having a second object frequency f2 for absorbing vibration of said surface; and a power transmission, on said first side, which transmits a driving force of said driving element to said driveshaft.

8. The apparatus of claim 7, wherein said first object frequency f1 is equal to said second object frequency f2.

9. The apparatus of claim 7, wherein said first object frequency f1 is different from said second object frequency f2.

10. The apparatus of claim 7, wherein said object frequency f1 and said object frequency f2 satisfy the following equation:

$$f1 < f2.$$

11. A driving apparatus for a rotating photoreceptor drum which is adapted for formation of a toner image on a surface thereof, said driving apparatus comprising:
a driveshaft for rotating said photoreceptor drum;
a flange physically connecting said surface with said driveshaft;
a driving element for rotating said driveshaft;
a first dynamic damper, at a first side of said photoreceptor drum, connected to an internal surface of said drum, and having a first object frequency f1 for absorbing vibration of said surface of said photoreceptor drum; and
a power transmission, at said first side, which transmits a driving force of said driving element to said driveshaft.

12. The driving apparatus of claim 11, further comprising:
a second driving damper, connected to said internal surface of said drum and affixed to said driveshaft, having a second object frequency f2 for absorbing a vibration of said drum.

13. The apparatus of claim 12, wherein said first object frequency f1 is equal to said second object frequency f2.

14. The apparatus of claim 13, wherein said first object frequency f1 and said second object frequency f2 satisfy the following equation:

$$f1 < f2.$$

15. The apparatus of claim 12, wherein said first object frequency f1 is different from said second object frequency f2.

16. A driving apparatus for moving a photoreceptor belt in an image forming apparatus comprising:
said photoreceptor belt adapted for formation of a toner image on a surface thereof;
a driving roller for driving said photoreceptor belt mounted on said driving roller;
a driveshaft for rotating said driving roller;
a flange physically connecting said driving roller and said driveshaft;
a driving element for rotating said driveshaft;
a first dynamic damper, at a first side of said driving roller on said driving shaft, having a first object frequency f1 for absorbing vibration of said photoreceptor belt;
a second dynamic damper, located at a second side which is opposite to said first side on said driveshaft, having a second object frequency f2 for absorbing vibration of said photoreceptor belt; and a power transmission, at said first side of said driving roller, for transmitting a driving force of said driving means to said driveshaft.

17. The apparatus of claim 16 wherein said first object frequency f1 is equal to said second object frequency f2.

18. The apparatus of claim 16 wherein said first object frequency f1 is different from said object frequency f2.

19. The apparatus of claim 16 wherein said object frequency f1 and said object frequency f2 satisfy the following equation:

$$f1 < f2.$$

20. A driving apparatus for moving a photoreceptor belt in an image forming apparatus comprising:
said photoreceptor belt adapted for formation of a toner image on a surface thereof;
a driving roller for driving said photoreceptor belt mounted on said driving roller;
a driveshaft for rotating said driving roller;
a driving element for rotating said driveshaft;
a flange physically connecting said driving roller and said driveshaft; said flange means including
a first dynamic damper, formed as a flange of said driving roller and located at a first side of said driving roller, and having a first object frequency f1 for absorbing vibration of said photoreceptor belt; and
a second dynamic damper, formed as a flange of said driving roller and at a second side of said driving roller which is opposite to said first side, said second damper having a second object frequency f2 for absorbing vibration of said photoreceptor belt; and
a power transmission, at said first side of said driving roller, transmitting a driving force of said driving means to said driveshaft.

21. The apparatus of claim 20 wherein said first object frequency f1 is equal to said second object frequency f2.

22. The apparatus of claim 20 wherein said first object frequency f1 is different from said second object frequency f2.

23. The apparatus of claim 20 wherein said object frequency f1 and said object frequency f2 satisfy the following equation:

$$f1 < f2.$$

24. A driving apparatus for moving a photoreceptor belt in an image forming apparatus comprising:
said photoreceptor belt adapted for formation of a toner image on a surface thereof;
a driving roller for driving said photoreceptor belt mounted on said driving roller;
a driveshaft for rotating said driving roller;
a flange physically connecting said driving roller and said driveshaft;
a driving element for rotating said driveshaft;
a first dynamic damper at a first side of said driving roller, connected to an internal surface of said driving roller, having a first object frequency f1 for absorbing vibration of said photoreceptor belt; and
a power transmission, at said first side, transmitting a driving force of said driving element to said drive shaft.

25. The driving apparatus of claim 24, further comprising a second driving damper, connected to said internal surface of said drum and affixed to said driveshaft, having a second object frequency f2 for absorbing a vibration of said drum.

26. The apparatus of claim 24 wherein said first object frequency f1 is equal to said second object frequency f2.

27. The apparatus of claim 24 wherein said first object frequency f1 is different from said second object frequency f2.

28. The apparatus of claim 24 wherein said object frequency f1 and said second object frequency f2 satisfy the following equation:

$$f1 < f2.$$

* * * * *